(12) United States Patent
Xiao

(10) Patent No.: US 9,538,132 B2
(45) Date of Patent: Jan. 3, 2017

(54) METHODS, DEVICES, AND SYSTEMS FOR CONTROLLING AUDIO AND VIDEO TRANSMISSION

(71) Applicant: TENCENT TECHNOLOGY (SHENZHEN) COMPANY LIMITED, Shenzhen, Guangdong Province (CN)

(72) Inventor: Shi Wei Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/428,466

(22) PCT Filed: Jul. 18, 2014

(86) PCT No.: PCT/CN2014/082474
§ 371 (c)(1),
(2) Date: Mar. 16, 2015

(87) PCT Pub. No.: WO2015/010572
PCT Pub. Date: Jan. 29, 2015

(65) Prior Publication Data
US 2016/0134837 A1 May 12, 2016

(30) Foreign Application Priority Data

Jul. 22, 2013 (CN) .......................... 2013 1 0309553

(51) Int. Cl.
*H04N 7/15* (2006.01)
*H04N 7/14* (2006.01)
*H04L 29/06* (2006.01)

(52) U.S. Cl.
CPC .......... *H04N 7/148* (2013.01); *H04L 65/1059* (2013.01); *H04L 65/601* (2013.01)

(58) Field of Classification Search
None
See application file for complete search history.

(56) References Cited

U.S. PATENT DOCUMENTS

2007/0180073 A1* 8/2007 Paul .................... H04L 12/5695
709/220
2010/0098176 A1* 4/2010 Liu ..................... H04L 12/1868
375/259
2011/0321112 A1* 12/2011 Nagy ................... H04W 28/22
725/118

* cited by examiner

*Primary Examiner* — Creighton Smith
(74) *Attorney, Agent, or Firm* — Anova Law Group, PLLC

(57) ABSTRACT

Methods and systems are provided for controlling an audio and video transmission. The method includes receiving audio and video information reported from terminals, after establishing an audio and video transmission connection according to an audio and video transmission connection request; acquiring terminal types and a type of the audio and video transmission connection request; adjusting one or more audio and video transmission parameters according to the audio and video information, the terminal types, and the type of the audio and video transmission connection request; and issuing the adjusted audio and video transmission parameters to the corresponding terminals.

10 Claims, 7 Drawing Sheets

METHODS, DEVICES, AND SYSTEMS FOR CONTROLLING AUDIO AND VIDEO TRANSMISSION

CROSS REFERENCE TO RELATED APPLICATIONS

This international application claims priority to Chinese Patent Application No. 201310309553.0, filed Jul. 22, 2013, the entire contents of which are incorporated herein by reference.

TECHNICAL FIELD

The present disclosure generally relates to the audio and video transmission technology and, more particularly, to methods, devices, and systems for controlling an audio video and video transmission.

BACKGROUND

With the development of network technology, online meetings can be realized through the application of video software and one party can play video for another party, which brings great convenience to the users. Conventionally, when a user A and a user B want to start a video chat, user A can send a video invitation to user B, who can accept the video chat after receiving the video invitation. Meanwhile, a server can send commands to establish a video connection between client terminals of user A and user B. The client terminals of user A and user B first attempt to establish a direct channel connection. If the direct channel connection fails, the client terminals can a relay channel connection. When the audio and video connection is successful, audio and video transmission parameters can be adjusted at the client terminals. However, the adjustment of audio and video transmission parameters at the client terminals generally needs to revise a control logic of audio and video streaming at the client terminals. Thus, there is a need to release a new version of the application, which will increase operating costs, and the control of audio and video transmission parameters has poor flexibility.

SUMMARY

According to a first aspect of the present disclosure, there is provided a method for controlling an audio and video transmission for use in an audio and video server, comprising: receiving audio and video information reported from terminals, after an audio and video transmission connection is established according to an audio and video transmission connection request; acquiring terminal types and a type of the audio and video transmission connection request; adjusting one or more audio and video transmission parameters according to the audio and video information, the terminal types, and the type of the audio and video transmission connection request; and issuing the adjusted audio and video transmission parameters to the corresponding terminals.

According to a second aspect of the present disclosure, there is provided a device for controlling an audio and video transmission, comprising: a processor; and a memory for storing instructions executable by the processor, wherein the processor is configured to: receive audio and video information reported from terminals, after an audio and video transmission connection is established according to an audio and video transmission connection request; acquire terminal types and a type of the audio and video transmission connection request; adjust one or more audio and video transmission parameters, according to the audio and video information, the terminal types, and the type of the audio and video transmission connection request; and issue the adjusted audio and video transmission parameters.

According to a third aspect of the present disclosure, there is provided a system for controlling an audio and video transmission, comprising: an audio and video server; a relay server; and at least two terminals. The at least two terminals are configured to establish an audio and video transmission connection according to an audio and video transmission connection request, and report, via the relay server, their respective audio and video information to the audio and video server. The audio and video server is configured to: receive the reported audio and video information; acquire a type of the audio and video transmission connection request, and terminal types corresponding to the at least two terminals, respectively; adjust audio and video transmission parameters of the at least two terminals, according to the audio and video information, the terminal types, and the type of the audio and video transmission connection request; and issue, via the relay server, the adjusted audio and video transmission parameters to the corresponding terminals.

It is to be understood that both the foregoing general description and the following detailed description are exemplary and explanatory only and are not restrictive of the inventions, as claimed,

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the inventions. Instead, they are merely examples of apparatuses and methods consistent with aspects related to the inventions as recited in the appended claims.

Figure 1:
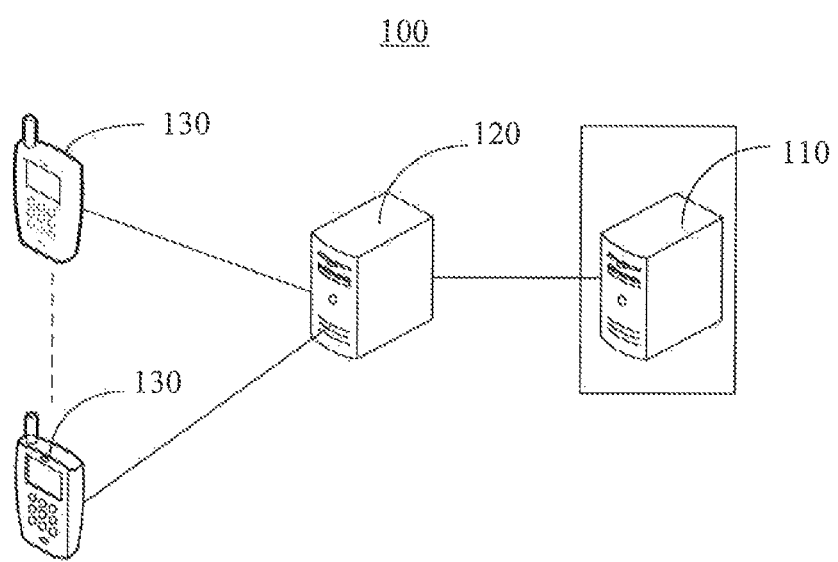
FIG. 1 is a block diagram of a system for controlling an audio and video transmission, according to an exemplary embodiment.

FIG. 1 is a block diagram of a system 100 for controlling an audio and video transmission channel according to an exemplary embodiment. Referring to FIG. 1, the system 100 comprises an audio and video server 110, a relay server 120, and at least two terminals 130.

In exemplary embodiments, the at least two terminals 130 are configured to request establishing an audio and video transmission connection, and report their respective transmission channel information to the audio and video server 110 via the relay server 120.

In one exemplary embodiment, an audio and video transmission connection is to be established between a first terminal and a second terminal of the at least two terminals 130. For example, the first terminal sends a request for the audio and video transmission connection to the second terminal, and the first and second terminals give priority to a direct connection. If the direct connection fails, the audio and video transmission connection is to be established via the relay server 120, according to the request. The first terminal and the second terminal report their respective audio and video information to the audio and video server 110, via the relay server 120. The audio and video information comprises a transmitting packet loss rate, a receiving packet loss rate, a time delay, or a CPU occupation rate. The time delay refers to a total elapsed time of a data packet from a start of sending to a reception by the opposite side. A high network packet loss rate or a long time delay indicates a poor network status. As a result, quality of the audio and video transmission is affected. A high CPU occupation rate will affect the audio and video decoding efficiency, and thus affect the quality of the audio and video transmission. In addition, the audio and video information also comprises a camera status, a microphone status, etc.

In exemplary embodiments, the audio and video server 110 is configured to receive the reported audio and video information, acquire a type of the audio and video transmission connection request and terminal types of the at least two terminals 130, respectively. The audio and video server 110 is further configured to adjust audio and video transmission parameters for the at least two terminals 130, respectively, according to the audio and video information, the terminal types, and the type of the audio and video transmission connection request, and issue the audio and video transmission parameters for the corresponding terminals 130.

In exemplary embodiments, the type of the audio and video transmission connection request can be a video playback request, a screen sharing request, etc. The video playback request refers to a request for playing a local video file to an opposite party during the audio and video transmission process. The screen sharing request refers to a request for playing a current user screen to the opposite party during the audio and video transmission process.

Terminal types comprise, but not are limited to, personal computers, smart phones, and tablet computers. Different types of terminals have different capabilities in handling audio and video encoding and decoding, depending on hardware parameters and operating systems.

The audio and video transmission parameters comprise at least one of a code rate, a frame rate, and a forward error correction (FEC) code. The code rate refers to a number of data bits transmitted per unit of time, e.g., 1 kilobits per second (kbps). The frame rate refers to a number of frames displayed per second. The FEC code is a data encoding technology.

The audio and video server 110 adjusts the audio and video transmission parameters, according to the audio and video information, the terminal types, and the type of the audio and video transmission connection request. For example, an initial audio and video transmission parameter issued for an Android system may be 320*160, and an initial audio and video transmission parameter issued for an iPhone may be 480*320. If the network connection is determined to be poor according to the audio and video information, the audio and video transmission parameters with a low resolution can be used. If the network connection is determined to be good, the audio and video parameters with a high resolution can be used. If the audio and video transmission connection request is a video playback request, the audio and video transmission parameters can be increased. If the audio and video transmission connection request is a screen sharing request, the audio and video transmission parameters can be reduced. Optimal audio and video transmission parameters can be determined according to the audio and video information, the terminal types, and the audio and video transmission connection request.

In the system 100, the audio and video server 110 adjusts the respective audio and video transmission parameters corresponding to the at least two terminals 130, according to the reported audio and video information, and the acquired terminal types and audio and video transmission connection request. The audio and video server 110 issues the adjusted audio and video transmission parameters to the corresponding terminals 130. The control of the system 100 is highly flexible, and operating costs are thus reduced.

In one exemplary embodiment, the audio and video server 110 is configured to acquire an operator type, and adjust the audio and video transmission parameters according to the audio and video information, the terminal types, and the audio and video transmission connection request, and the operator type.

In one exemplary embodiment, operator types comprise China Unicom, China Telecom, China Mobile and other service providers. The network signal quality of different operators may be different, and it would be more flexible if the adjustment of the audio and video transmission parameters is also based on the operator types.

In exemplary embodiments, the relay server 120 is a relay server that matches the operator type.

For example, the relay server 120 is located in an extranet of the service provider, the audio and video server 110 is deployed at an intranet of the service provider, and the terminals 130 located on the client side directly communicate with the relay server 120. The relay server 120 can be flexibly deployed for different operators. For example, there can be relay servers for China Unicom, from China Telecom, and China Mobile. If the audio and video transmission is being conducted between a Unicom user and a Telecom user, audio and video data from the Unicom user is received by Unicom's relay server. After the audio and video data enters into the audio and video server, it will be retransmitted to Telecom's relay server for further transmitting to the Telecom user. In this way, the time delay and unreliable server quality caused by cross-operator communications can be reduced.

In one exemplary embodiment, the at least two terminals 130 are configured to periodically report their respective current audio and video information. The audio and video server 110 is configured to periodically receive the reported current audio and video information, acquire historical audio and video information, judge whether the audio and video transmission environment has changed according to the current audio and video information and the historical audio and video information. If so, the audio and video server 110 adjusts the respective audio and video transmission parameters corresponding to the at least two terminals 130, according to the current audio and video information, the terminal types, and the type of the audio and video transmission connection request, and issues the adjusted audio and video transmission parameters to the corresponding terminals 130 via the relay server 120. Otherwise, the audio and video server 110 determines not to adjust the audio and video transmission parameters.

For example, the current audio and video information can be the information within a first preset time period from a current moment. The first preset time is relatively short, e.g., 2 seconds or 3 seconds. The historical audio and video information can be the information within a second preset time period from the current moment. The second preset time period is relatively long, e.g., 30 seconds or 50 seconds. The second preset time period is greater than the first preset time period. The current audio and video information comprises a transmitting packet loss rate, a receiving packet loss rate, a time delay, a CPU occupation rate, a camera status, a microphone status, etc. Similarly, the historical audio and video information comprises a transmitting packet loss rate, a receiving packet loss rate, a time delay, a CPU occupation rate, a camera status, a microphone status, etc. The network environment changes when great changes have taken place in the receiving packet loss rate, the time delay, etc. For example, a difference between two adjacent receiving packet loss rates is greater than a first preset error value, or a difference between two adjacent time delay values is greater than a second preset error value.

Figure 2:
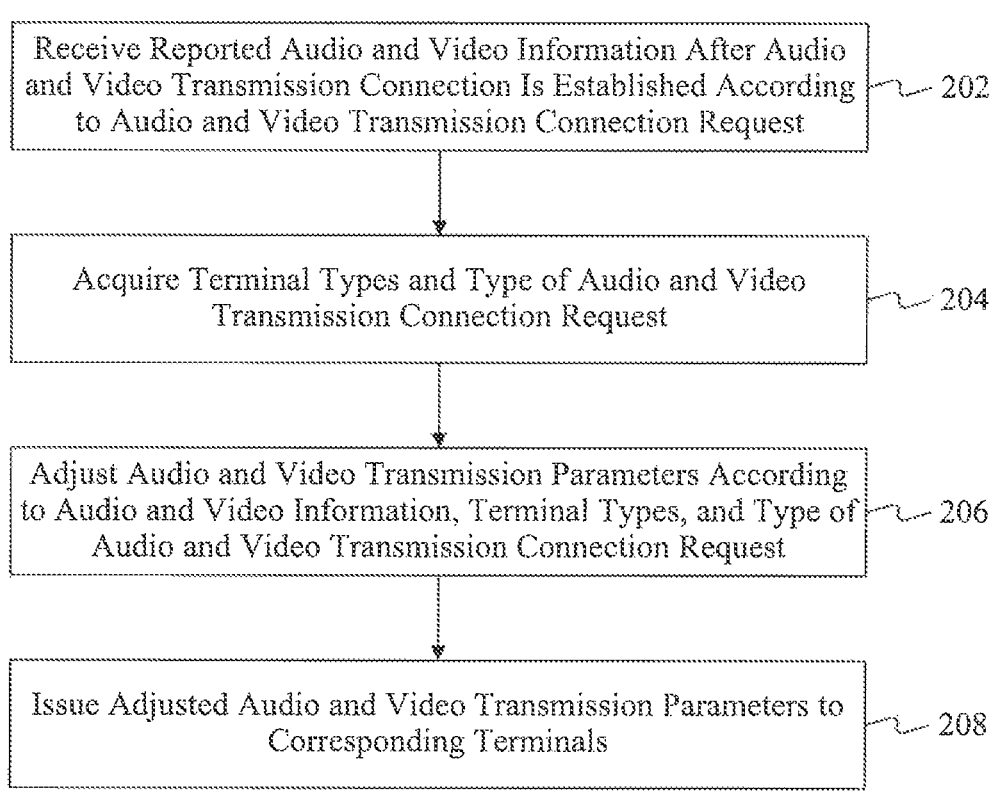
FIG. 2 is a flowchart of a method for controlling an audio and video transmission, according to an exemplary embodiment.

FIG. 2 is a flowchart of a method 200 for controlling an audio and video transmission, according to an exemplary embodiment. The method 200 can be implemented with an audio and video server, such as the audio and video server 110 (FIG. 1). Referring to FIG. 2. the method 200 includes the following steps.

In step 202, the audio and video server receives audio and video information reported from terminals after an audio and video transmission connection is established according to an audio and video transmission connection request.

For example, an audio and video transmission connection is to be established between first and second terminals via instant messaging (IM) software. The first terminal sends an audio and video transmission connection request to the second terminal. According to this request, the audio and video transmission connection is established between the first terminal and the second terminal via a relay server.

The audio and video information comprises a transmitting packet loss rate, a receiving packet loss rate, a time delay, or a CPU occupation rate. The time delay refers to a total elapsed time of a data packet from a start of sending to a reception by the opposite side. A high network packet loss rate or a long time delay indicates a poor network status. As a result, quality of the audio and video transmission is affected. A high CPU occupation rate will affect the audio and video decoding efficiency, and thus affect the quality of the audio and video transmission. In addition, the audio and video information also comprises a camera status, a microphone status, etc.

In step 204, the audio and video server acquires terminal types of the terminals and a type of the request for the audio and video transmission connection.

In exemplary embodiments, the type of the audio and video transmission connection request can be a video playback request, a screen sharing request, etc. The video playback request refers to a request for playing a local video file to an opposite party during the audio and video transmission process. The screen sharing request refers to a request for playing a current user screen to the opposite party during the audio and video transmission process.

Terminal types comprise, but not are limited to, personal computers, smart phones, and tablet computers. Different types of terminals have different capabilities in handling audio and video encoding and decoding, depending on hardware parameters and operating systems.

In step 206, the audio and video server adjusts audio and video transmission parameters, according to the audio and video information, the terminal types, and the type of the audio and video transmission connection request.

The audio and video transmission parameters comprise at least one of a code rate, a frame rate, and a forward error correction (FEC) code. The code rate refers to a number of data bits transmitted per unit of time, e.g., 1 kilobits per second (kbps). The frame rate refers to a number of frames displayed per second. The FEC code is a data encoding technology.

If the network connection is determined to be good, the audio and video parameters with a high resolution can be used. If the audio and video transmission connection request is a video playback request, the audio and video transmission parameters can be increased. If the audio and video transmission connection request is a screen sharing request, the audio and video transmission parameters can be reduced. Optimal audio and video transmission parameters can be determined according to the audio and video information, the terminal types, and the audio and video transmission connection request.

In step 208, the audio and video server issues the adjusted audio and video transmission parameters to the corresponding terminals.

In the method 200, the audio and video server adjusts the respective audio and video transmission parameters corresponding to respective terminals, according to the reported audio and video information, and the acquired terminal types and audio and video transmission connection request. The audio and video server issues the adjusted audio and video transmission parameters to the corresponding terminals. The method 200 is highly flexible, and operating costs are thus reduced.

Figure 3:
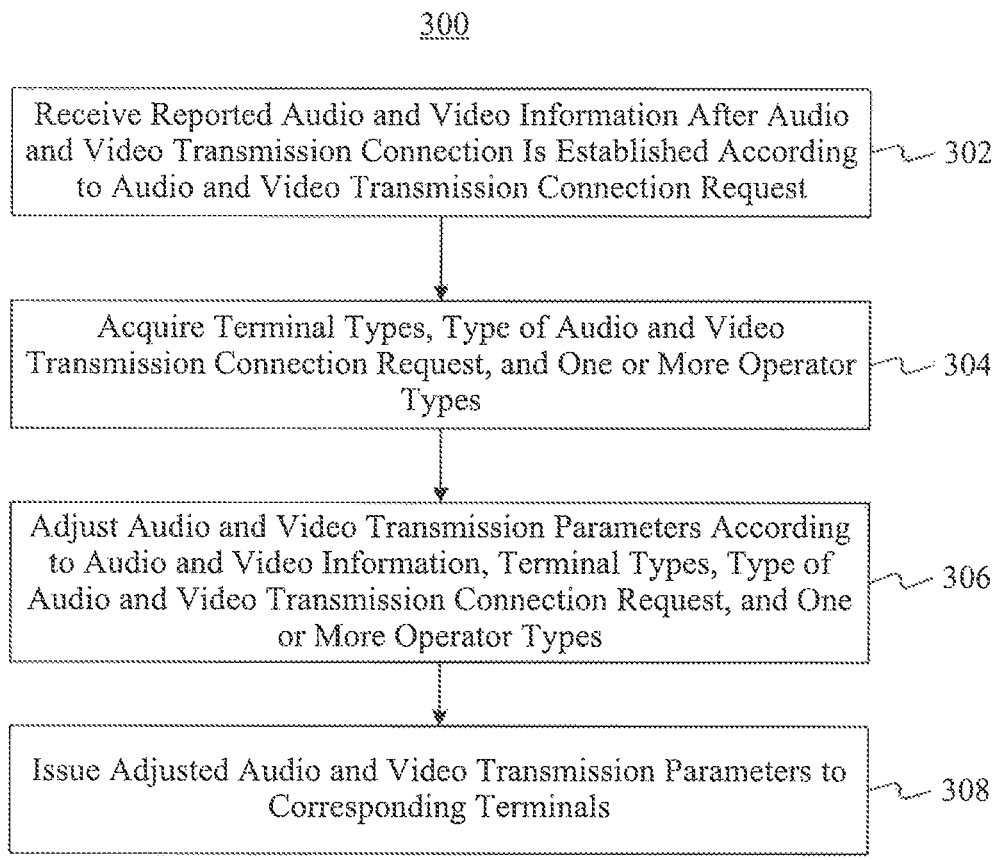
FIG. 3 is a flowchart of a method for controlling an audio and video transmission, according to an exemplary embodiment.

FIG. 3 is a flowchart of a method 300 for controlling an audio and video transmission, according to an exemplary embodiment. The method 300 can be implemented with an audio and video server, such as the audio and video server 110 (FIG. 1). Referring to FIG. 3, the method 300 includes the following steps.

In step 302, the audio and video server receives reported audio and video information after an audio and video transmission connection is established according to an audio and video transmission connection request.

In step 304, the audio and video server acquires types of the terminals, a type of the audio and video transmission connection request, and one or more operator types.

In step 306, the audio and video server adjusts audio and video transmission parameters, according to the audio and video information, the terminal types, and the audio and video transmission connection request, and the operator types.

In one exemplary embodiment, operator types comprise China Unicom, China Telecom, China Mobile and other service providers. The network signal quality of different operators may be different, and it would be more flexible if the adjustment of the audio and video transmission parameters is also based on the operator types.

In step 308, the audio and video server issues the adjusted audio and video transmission parameters to the corresponding terminals.

In the method 300, the audio and video server adjusts the respective audio and video transmission parameters corresponding to respective terminals, according to the reported audio and video information, and the acquired terminal types, operator types, and audio and video transmission connection request. The audio and video server issues the adjusted audio and video transmission parameters to the corresponding terminals. The method 300 is highly flexible, and operating costs are thus reduced.

Figure 4:
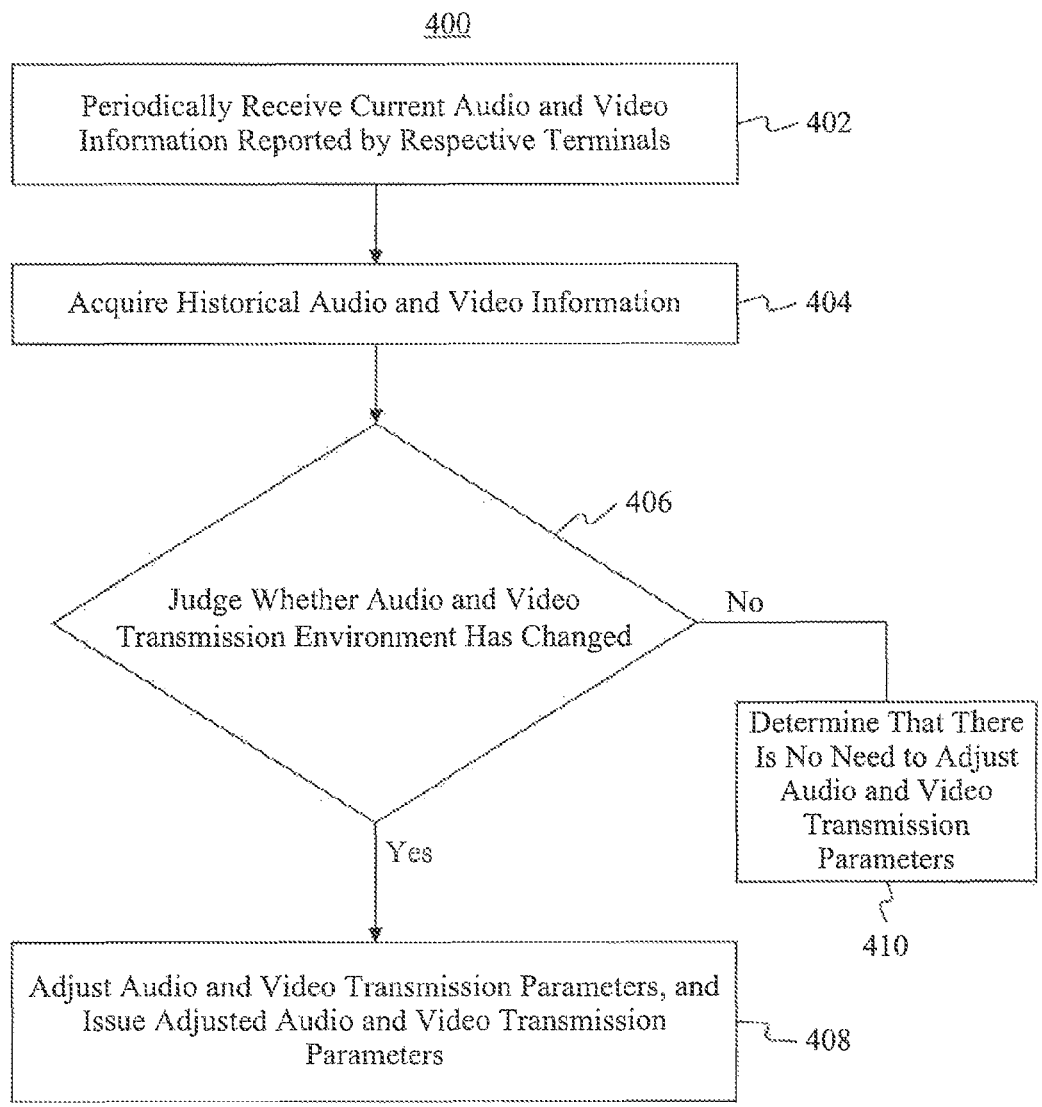
FIG. 4 is a flowchart of a method for controlling an audio and video transmission, according to an exemplary embodiment.

FIG. 4 is a flowchart of a method 400 for controlling an audio and video transmission, according to an exemplary embodiment. The method 400 can be implemented with an audio and video server, such as the audio and video server 110 (FIG. 1). Referring to FIG. 4, the method 400 includes the following steps.

In step 402, the audio and video server periodically receives current audio and video information reported by respective terminals.

For example, the current audio and video information can be the information within a first preset time period from a current moment. The first preset time is relatively short, e.g., 2 seconds or 3 seconds. The current audio and video information comprises a transmitting packet loss rate, a receiving packet loss rate, a time delay, a CPU occupation rate, a camera status, a microphone status, etc.

In step 404, the audio and video server acquires historical audio and video information.

For example, the historical audio and video information can be the information within a second preset time period from the current moment. The second preset time period is relatively long, e.g., 30 seconds or 50 seconds. The second preset time period is greater than the first preset time period. The historical audio and video information comprises a transmitting packet loss rate, a receiving packet loss rate, a time delay, a CPU occupation rate, a camera status, a microphone status, etc.

In step 406, the audio and video server judges whether the audio and video transmission environment has changed, according to the current audio and video information and the historical audio and video information. If so, step 408 is performed; otherwise, step 410 is performed.

In step 408, the audio and video server adjusts audio and video transmission parameters, according to the current audio and video information, terminal types, and an audio and video transmission connection request, and issues the adjusted audio and video transmission parameters.

For example, the network environment changes when great changes have taken place in the receiving packet loss rate, the time delay, etc. For example, a difference between two adjacent receiving packet loss rates is greater than a first preset error value, or a difference between two adjacent time delay values is greater than a second preset error value.

In step 410, the audio and video server determines there is no need to adjust the audio and video transmission parameters.

In the method 400, the audio and video server judges whether the network environment has changed, according to the periodically-reported current audio and video information and the historical audio and video information, and dynamically adjusts the audio and video transmission parameters. The adjustment is flexible, the network resources are reasonably utilized, and the stability of the audio and video transmission is improved.

Figure 5:
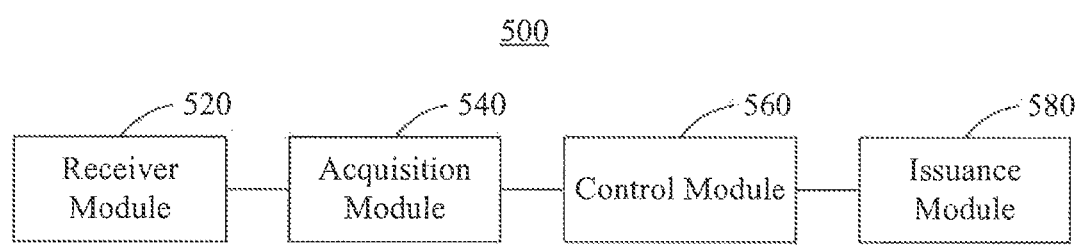
FIG. 5 is a block diagram of a device for controlling an audio and video transmission, according to an exemplary embodiment.

FIG. 5 is a block diagram to a device 500 for controlling an audio and video transmission, according to an exemplary embodiment. For example, the device 500 can be included in an audio and video server. Referring to FIG. 5, the device 500 includes a receiver module 520, an acquisition module 540, a control module 560, and an issue module 580.

The receiver module 520 is configured to receive reported audio and video information after an audio and video transmission connection is established according to an audio and video transmission connection request.

For example, an audio and video transmission connection is to be established between first and second terminals via instant messaging (IM) software. The first terminal sends a request for the audio and video transmission connection to the second terminal. According to this request, the audio and video transmission connection is established between the first terminal and the second terminal via a relay server.

The audio and video information, comprises a transmitting packet loss rate, a receiving packet loss rate, a time delay, or a CPU occupation rate. The time delay refers to a total elapsed time of a data packet from a start of sending to a reception by the opposite side. A high network packet loss rate or a long time delay indicates a poor network status. As a result, quality of the audio and video transmission is affected. A high CPU occupation rate will affect the audio and video decoding efficiency, and thus affect the quality of the audio and video transmission. In addition, the audio and video information also comprises a camera status, a microphone status, etc.

The acquisition module 540 is configured to acquire terminal types and a type of the audio and video transmission connection request.

In exemplary embodiments, the type of the audio and video transmission connection request can be a video playback request, a screen sharing request, etc. The video playback request refers to a request for playing a local video file to an opposite party during the audio and video transmission process. The screen sharing request refers to a request for playing a current user screen to the opposite party during the audio and video transmission process.

Terminal types comprise, but not are limited to, personal computers, smart phones, and tablet computers. Different types of terminals have different capabilities in handling audio and video encoding and decoding, depending on hardware parameters and operating systems.

The control module 560 is configured to adjust audio and video transmission parameters, according to the audio and video information, the terminal types, and the type of the audio and video transmission connection request.

For example, the audio and video transmission parameters comprise at least one of a code rate, a frame rate, and a forward error correction (FEC) code. The code rate refers to a number of data bits transmitted per unit of time, e.g., 1 kilobits per second (kbps). The frame rate refers to a number of frames displayed per second. The FEC code is a data encoding technology.

If the network connection is determined to be good, the audio and video parameters with a high resolution can be used. If the audio and video transmission connection request is a video playback request, the audio and video transmission parameters can be increased. If the audio and video transmission connection request is a screen sharing request, the audio and video transmission parameters can be reduced. Optimal audio and video transmission parameters can be determined according to the audio and video information, the terminal types, and the audio and video transmission connection request.

The issuance module 500 is configured to issue the adjusted audio and video transmission parameters.

By using the device 500, the audio and video server adjusts the respective audio and video transmission parameters corresponding to respective terminals, according to the reported audio and video information, and the acquired terminal types and audio and video transmission connection request. The audio and video server issues the adjusted audio and video transmission parameters to the corresponding terminals. The control of the device 500 is highly flexible, and operating costs are thus reduced.

In one exemplary embodiment the acquisition module 540 is also configured to acquire operator types, and the control module 560 is further configured to adjust the audio and video transmission parameters, according to the audio and video information, the terminal types, and the audio and video transmission connection request, and the operator types.

In one exemplary embodiment, operator types comprise China Unicom, China Telecom, China Mobile and other service providers. The network signal quality of different operators may be different, and it would be more flexible if the adjustment of the audio and video transmission parameters is also based on the operator types.

Figure 6:
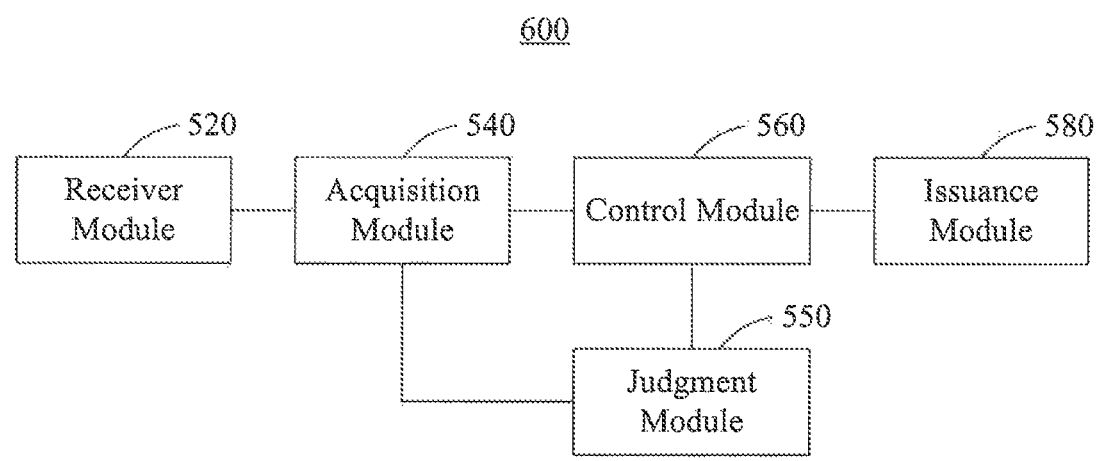
FIG. 6 is a block diagram of a device for controlling an audio and video transmission, according to an exemplary embodiment.

FIG. 6 is a block diagram of a device 600 for controlling an audio and video transmission, according to an exemplary embodiment. For example, the device 600 can be included in an audio and video server. Referring to FIG. 6, the device 600 includes a judgment module 550, in addition to the receiver module 520, the acquisition module 540, the control module 560, and the issuance module 580.

The receiver module 520 is further configured to periodically receive reported current audio and video information.

For example, the current audio and video information can be the information within a first preset time period from a current moment. The first preset time is relatively short, e.g., 2 seconds or 3 seconds. The current audio and video information comprises a transmitting packet loss rate, a receiving packet loss rate, a time delay, a CPU occupation rate, a camera status, a microphone status, etc.

The acquisition module 540 is further configured to receive historical audio and video information. For example, the historical audio and video information can be the information within a second preset time period from the current moment. The second preset time period is relatively long, e.g., 30 seconds or 50 seconds. The second preset time period is greater than the first preset time period. The historical audio and video information comprises a transmitting packet loss rate, a receiving packet loss rate, a time delay, a CPU occupation rate, a camera status, a microphone status, etc.

The judgment module 550 is configured to judge whether the audio and video transmission environment has changed, according to the current audio and video information and the historical audio and video information. For example, the network environment changes when great changes have taken place in the receiving packet loss rate, the time delay, etc. For example, a difference between two adjacent receiving packet loss rates is greater than a first preset error value, or a difference between two adjacent time delay values is greater than a second preset error value.

The control module 560 is further configured to adjust the audio and video transmission parameters, according to the audio and video information, the terminal types, and the type of the audio and video transmission connection request, when the audio and video transmission environment has changed. The control module 560 is also configured to determine that there is no need to adjust the audio and video transmission parameters, if the audio and video transmission environment has not changed.

The issuance module 580 is further configured to issue the adjusted audio and video transmission parameters.

By using the device 600, the audio and video server judges whether the network environment has changed, according to the periodically-reported current audio and video information and the historical audio and video information, and dynamically adjusts the audio and video transmission parameters. The adjustment is flexible, the network resources are reasonably utilized, and the stability of the audio and video transmission is improved.

Figure 7:
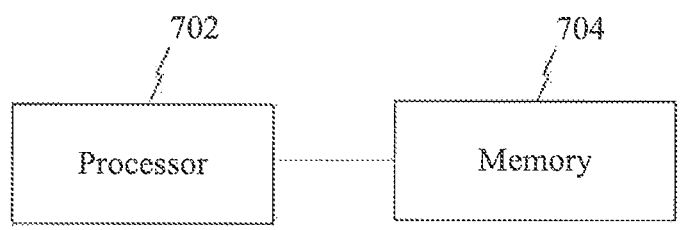
FIG. 7 is a block diagram of a device for controlling an audio and video transmission, according to an exemplary embodiment.

FIG. 7 is a block diagram of a device 700 for controlling an audio and video transmission, according to an exemplary embodiment. For example, the device 700 can be an audio and video server. Referring to FIG. 7, the device 700 includes a processor 702 and a memory 704 for storing data as well as for storing instructions to perform the above described methods for controlling an audio and video transmission, and otherwise facilitating operation of the processor 702.

In exemplary embodiments, there is also provided a non-transitory computer-readable storage medium including instructions, such as included in the memory 704, executable by the processor 702, for performing the above-described methods for controlling an audio and video transmission channel. For example, the storage medium can be a disk, a CD-ROM, a read-only memory, or a random access memory and so on.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

Other embodiments of the inventions will be apparent to those skilled in the art from consideration of the specification and practice of the inventions disclosed here. This application is intended to cover any variations, uses, or adaptations of the inventions following the general principles thereof and including such departures from the present disclosure as come within known or customary practice in the art. It is intended that the specification and examples be considered as exemplary only, with a true scope and spirit of the inventions being indicated by the following claims.

It will be appreciated that the present inventions are not limited to the exact construction that has been described above and illustrated in the accompanying drawings, and that various modifications and changes can be made without departing from the scope thereof. It is intended that the scope of the inventions only be limited by the appended claims.

The invention claimed is:

1. A method for controlling an audio and video transmission for use in an audio and video server, comprising:

receiving audio and video information reported from terminals, after an audio and video transmission connection is established according to an audio and video transmission connection request;

acquiring terminal types and a type of the audio and video transmission connection request;

adjusting one or more audio and video transmission parameters according to the audio and video information, the terminal types, and the type of the audio and video transmission connection request; and issuing the adjusted audio and video transmission parameters to the corresponding terminals;

wherein the adjusting one or more audio and video transmission parameters further comprising:

acquiring an operator type; and adjusting the audio and video transmission parameters, according to the audio and video information, the terminal types, the type of the audio and video transmission connection request, and the operator type.

2. The method of claim 1, further comprising:

periodically receiving current audio and video information reported from the terminals;

acquiring historical audio and video information;

judging whether an audio and video transmission environment has changed, according to the current audio and video information and the historical audio and video information;

if it is judged that the audio and video transmission environment has changed, adjusting the audio and video transmission parameters, according to the current audio and video information, the terminal types, and the type of the audio and video transmission connection request, and issuing the adjusted audio and video transmission parameters; and if it is judged that the audio and video transmission environment has not changed, determining that there is no need to adjust the audio and video transmission parameters.

3. The method of claim 1, wherein: the audio and video information comprises at least one of a transmitting packet loss rate, a receiving packet loss rate, a time delay, or a CPU occupation rate, the type of the audio and video transmission connection request comprises at least one of a video playback request or a screen sharing request, and the audio and video transmission parameters comprise at least one of a bit rate, a frame rate, or a forward error correcting (FEC) code.

4. A device for controlling an audio and video transmission, comprising:

a processor; and a memory for storing instructions executable by the processor, wherein the processor is configured to:

receive audio and video information reported from terminals, after an audio and video transmission connection is established according to an audio and video transmission connection request;

acquire terminal types and a type of the audio and video transmission connection request, adjust one or more audio and video transmission parameters, according to the audio and video information, the terminal types, and the type of the audio and video transmission connection request; and issue the adjusted audio and video transmission parameters;

wherein the processor is further configured to:

acquire an operator type; and adjust the audio and video transmission parameters according to the audio and video information, the terminal types, the type of the audio and video transmission connection request, and the operator type.

5. The device of claim 4, wherein the processor is further configured to:

periodically receive current audio and video information;

acquire historical audio and video information;

judge whether an audio and video transmission environment has changed, according to the current audio and video information and the historical audio and video information;

if it is judged that the audio and video transmission environment has changed, adjust the audio and video transmission parameters according to the current audio and video information, the terminal types, and the type of the audio and video transmission connection request type; and if it is judged that the audio and video transmission environment has not changed, determine that there is no need to adjust the audio and video transmission parameters.

6. The device of claim 4, wherein: the audio and video information comprises at least one of a transmitting packet loss rate, a receiving packet loss rate, a time delay, or a CPU occupation rate, the type of the audio and video transmission connection request comprises at least one of a video playback request or a screen sharing request, and the audio and video transmission parameters comprise at least one of a bit rate, a frame rate, or a forward error correcting (FEC) code.

7. A system for controlling an audio and video transmission, comprising:

an audio and video server;

a relay server; and at least two terminals;

wherein the at least two terminals are configured to establish an audio and video transmission connection according to an audio and video transmission connection request, and report, via the relay server, their respective audio and video information to the audio and video server; and the audio and video server is configured to:

receive the reported audio and video information;

acquire a type of the audio and video transmission connection request, and terminal types corresponding to the at least two terminals, respectively;

adjust audio and video transmission parameters of the at least two terminals, according to the audio and video information, the terminal types, and the type of the audio and video transmission connection request; and issue, via the relay server, the adjusted audio and video transmission parameters to the corresponding terminals;

wherein the audio and video server is further configured to acquire an operator type, and adjust the audio and video transmission parameters according to the audio and video information, the terminal types, the type of the audio and video transmission connection request, and the operator type.

8. The system of claim 7, wherein the at least two terminals are further configured to periodically report their respective current audio and video information, and the audio and video server is further configured to:

periodically receive the reported current audio and video information;

acquire historical audio and video information;

judge whether an audio and video transmission environment has changed, according to the current audio and video information and the historical audio and video information;

if it is judged that the audio and video transmission environment has changed, adjust the audio and video transmission parameters of the at least two terminals, according to the current audio and video information, the terminal types, and the type of the audio and video transmission connection request; and issue, via the relay server, the adjusted audio and video transmission parameters to the corresponding terminals; and if it is judged that the audio and video transmission environment has not changed, determine that there is no need to adjust the audio and video transmission parameters.

9. The system of claim 7, wherein: the audio and video information comprises at least one of a transmitting packet loss rate, a receiving packet loss rate, a time delay, or a CPU occupation rate, the type of the audio and video transmission connection request comprises at least one of a video playback request or a screen sharing request, and the audio and video transmission parameters comprise at least one of a bit rate, a frame rate, or a forward error correcting (FEC) code.

10. The system of claim 7, wherein the relay server is a server that matches the operator type.

* * * * *